US010688602B2

(12) United States Patent
Kawata et al.

(10) Patent No.: US 10,688,602 B2
(45) Date of Patent: Jun. 23, 2020

(54) SUBMERGED ARC WELDING PROCESS

(71) Applicant: Kobe Steel, Ltd., Kobe-shi (JP)

(72) Inventors: Junichi Kawata, Fujisawa (JP); Kazuhiro Fukuda, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 368 days.

(21) Appl. No.: 15/645,394

(22) Filed: Jul. 10, 2017

(65) Prior Publication Data

US 2018/0015575 A1 Jan. 18, 2018

(30) Foreign Application Priority Data

Jul. 13, 2016 (JP) ................................ 2016-138788

(51) Int. Cl.

*B23K 35/30* (2006.01)
*B23K 35/36* (2006.01)
*B23K 9/18* (2006.01)
*B23K 35/02* (2006.01)
*B23K 103/04* (2006.01)

(52) U.S. Cl.

CPC ............ *B23K 35/3033* (2013.01); *B23K 9/18* (2013.01); *B23K 35/0261* (2013.01); *B23K 35/304* (2013.01); *B23K 2103/04* (2018.08)

(58) Field of Classification Search

CPC .............. B23K 35/3033; B23K 35/304; B23K 35/3062; B23K 35/362; B23K 35/365; B23K 35/0261; B23K 9/18; B23K 35/3602

See application file for complete search history.

(56) References Cited

U.S. PATENT DOCUMENTS 3,490,960 A * 1/1970 Kano .................. B23K 35/362 148/24
3,529,996 A * 9/1970 Joseph .............. B23K 35/3033 428/561
5,300,754 A * 4/1994 Gonzalez .......... B23K 35/3073 219/146.3

(Continued)

FOREIGN PATENT DOCUMENTS

CN 105408054 A 3/2016
JP 10-94895 4/1998

(Continued)

OTHER PUBLICATIONS

Advertising brochure "Hastelloy (registered trademark) C-276 (Alloy C-276), UNSN06985", Jun. 2015, by Ulbrich Stainless Steels & Special Metals, Inc, pp. 1-4.*

*Primary Examiner* — Geoffrey S Evans
(74) *Attorney, Agent, or Firm* — Oblon, McClelland, Maier & Neustadt, L.L.P.

(57) ABSTRACT

A submerged arc welding process using welding wire containing, based on the total mass of the welding wire, Ni: 50% or more by mass, Cr: 14.5% to 16.5% by mass, Mo: 15.0% to 17.0% by mass, W: 3.0% to 4.5% by mass, Fe: 4.0% to 7.0% by mass, and C, Si, Mn, P, S, Cu, V, Co, and Al: a predetermined amount or less, and a bonded flux containing, based on the total mass of the bonded flux, $Al_2O_3$: 35% to 55% by mass, $SiO_2$: 5% to 25% by mass, CaO: 2% to 10% by mass, $CaF_2$: 25% to 45% by mass, and $Na_2O$: 2% to 4% by mass.

4 Claims, 5 Drawing Sheets

(56) References Cited

U.S. PATENT DOCUMENTS

| | | | | |
|---|---|---|---|---|
| 2004/0129348 | A1* | 7/2004 | Ikeda | B23K 9/18<br>148/332 |
| 2014/0339201 | A1* | 11/2014 | James | B23K 9/186<br>219/73.2 |
| 2016/0175993 | A1* | 6/2016 | Kano | B23K 35/30<br>219/73 |

FOREIGN PATENT DOCUMENTS

| | | | | |
|---|---|---|---|---|
| JP | 2009-39761 | | 2/2009 | |
| WO | WO-2014021097 | A1 * | 2/2014 | B23K 35/3602 |
| WO | WO-2015019684 | A1 * | 2/2015 | |

* cited by examiner

SUBMERGED ARC WELDING PROCESS

BACKGROUND OF THE INVENTION

1. Field of the Invention

The present invention relates to a submerged arc welding process and more particularly to a submerged arc welding process using a particular welding wire and a particular bonded flux in combination.

2. Description of the Related Art

In order to prevent hot cracking of steel for cryogenic liquid storage, such as 9% Ni steel, used as a construction material for cryogenic liquid storage tanks for storing cryogenic liquids, such as liquefied natural gas (LNG), a shielded metal-arc welding process, which requires relatively low heat input, has been applied to welding of the steel for cryogenic liquid storage. Since the development of wire with high hot cracking resistance, however, submerged arc welding has increasingly been applied to actual structures in order to improve the construction efficiency of welded structures. Metals obtained by welding cryogenic construction materials by submerged arc welding must have high strength and low-temperature toughness comparable to those of base materials.

Nickel-alloy welding wires containing 50% or more Ni by mass have been used as welding materials for welding of cryogenic liquid storage tanks in order to meet high quality requirements (strength and toughness). Nickel-alloy welding wires, such as Inconel alloy and Hastelloy alloy wires, are appropriately chosen on the basis of demand characteristics (such as corrosion resistance and hot cracking resistance).

With respect to a submerged arc welding process using nickel-alloy welding wire for steels for cryogenic liquid storage used as construction materials for cryogenic liquid storage tanks, for example, Japanese Unexamined Patent Application Publication No. 2009-39761 discloses a flux containing slag-forming and alloying components adjusted to stabilize slag detachability and bead shapes. Japanese Unexamined Patent Application Publication No. 10-94895 discloses a flux having a composition and bulk density adjusted to ensure low-temperature toughness as well as slag detachability and bead smoothness.

Among Hastelloy alloy wires, however, Hastelloy C276 nickel-alloy welding wires in submerged arc welding may cause deterioration of the low-temperature toughness of weld metals.

The submerged arc welding position for cryogenic liquid storage tanks is mainly a flat or horizontal position. Depending on the solidification temperature of molten slag, horizontal position welding may result in poor welding performance, for example, due to sagging of weld beads, rough bead surfaces resulting from unstable shapes, or poor slag detachability.

SUMMARY OF THE INVENTION

Accordingly, it is an object of the present invention to provide a submerged arc welding process using Hastelloy C276 submerged arc welding materials (welding wire and fluxes) that produces weld metals with good low-temperature toughness even at cryogenic temperatures and that has high welding performance (bead shapes and bead appearances) particularly in horizontal position welding.

The present inventors have performed extensive studies to achieve the object. The present inventors assumed that intermetallic compounds (a Si source and an Al source) and carbides precipitating in a weld metal obtained by submerged arc welding using a Hastelloy C276 nickel-alloy welding wire are responsible for deterioration of the low-temperature toughness of the weld metal and have studied the wire composition and the flux composition that do not cause the precipitation of intermetallic compounds and carbides in weld metals. The present inventors have also studied the adjustment of a flux composition in a particular range to achieve good horizontal position welding performance. The present inventors have completed the present invention by finding that the object can be achieved by the following submerged arc welding process.

The present invention relates to a submerged arc welding process using a welding wire and a bonded flux in combination, wherein the welding wire contains, based on a total mass of the welding wire, Ni: 50% or more by mass,
Cr: 14.5% to 16.5% by mass,
Mo: 15.0% to 17.0% by mass,
W: 3.0% to 4.5% by mass,
Fe: 4.0% to 7.0% by mass,
C: 0.02% or less by mass (excluding 0% by mass),
Si: 0.08% or less by mass (excluding 0% by mass),
Mn: 1.0% or less by mass (excluding 0% by mass),
P: 0.04% or less by mass (excluding 0% by mass),
S: 0.03% or less by mass (excluding 0% by mass),
Cu: 0.5% or less by mass (excluding 0% by mass),
V: 0.35% or less by mass (excluding 0% by mass),
Co: 2.5% or less by mass (excluding 0% by mass), and
Al: 0.1% or less by mass (excluding 0% by mass), and the bonded flux contains, based on a total mass of the bonded flux, $Al_2O_3$: 35% to 55% by mass,
$SiO_2$: 5% to 25% by mass,
CaO: 2% to 10% by mass,
$CaF_2$: 25% to 45% by mass, and
$Na_2O$: 2% to 4% by mass.

In the submerged arc welding process, the bonded flux is preferably substantially free of carbonates.

In the submerged arc welding process, the bonded flux is preferably substantially free of Al and Si.

The submerged arc welding process is preferably applied to welding of steel for cryogenic liquid storage.

A submerged arc welding process according to the present invention using Hastelloy C276 submerged arc welding materials can produce weld metals with good low-temperature toughness even at cryogenic temperatures and has high welding performance (bead shapes and bead appearances) particularly in horizontal position welding.

DESCRIPTION OF THE PREFERRED EMBODIMENTS

Figure 1A:
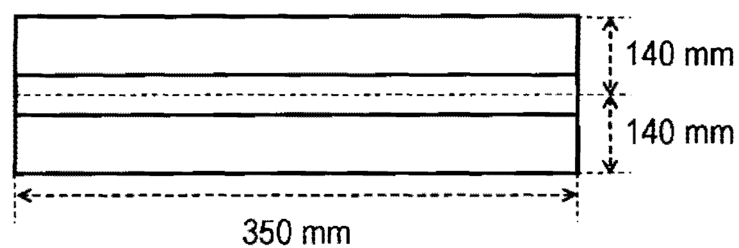
FIG. 1A is a front view showing the shape and size of a base material from which Charpy impact test specimens are taken.

Embodiments of the present invention will be described in detail below.

A submerged arc welding process according to the present embodiment is a submerged arc welding process using a welding wire and a bonded flux in combination, wherein the welding wire contains, based on the total mass of the welding wire, Ni: 50% or more by mass, Cr: 14.5% to 16.5% by mass, Mo: 15.0% to 17.0% by mass, W: 3.0% to 4.5% by mass, Fe: 4.0% to 7.0% by mass, C: 0.02% or less by mass (excluding 0% by mass), Si: 0.08% or less by mass (excluding 0% by mass), Mn: 1.0% or less by mass (excluding 0% by mass), P: 0.04% or less by mass (excluding 0% by mass), S: 0.03% or less by mass (excluding 0% by mass), Cu: 0.5% or less by mass (excluding 0% by mass), V: 0.35% or less by mass (excluding 0% by mass), Co: 2.5% or less by mass (excluding 0% by mass), and Al: 0.1% or less by mass (excluding 0% by mass), and the bonded flux contains, based on the total mass of the bonded flux, $Al_2O_3$: 35% to 55% by mass, $SiO_2$: 5% to 25% by mass, CaO: 2% to 10% by mass, $CaF_2$: 25% to 45% by mass, and Na2O: 2% to 4% by mass.

<Welding Wire>

First, the reason for limiting the amount of each component of the welding wire (hereinafter also referred to as the welding wire according to the present embodiment or simply as the wire) for use in the submerged arc welding process according to the present embodiment will be described below. Mass percentage (% by mass) in the present specification is synonymous with weight percentage (% by weight). "X % or less by mass (excluding 0% by mass)" with respect to the component content is also referred to as "more than 0% and X % or less by mass".

The welding wire according to the present embodiment contains, based on the total mass of the welding wire, Ni: 50% or more by mass, Cr: 14.5% to 16.5% by mass, Mo: 15.0% to 17.0% by mass, W: 3.0% to 4.5% by mass, Fe: 4.0% to 7.0% by mass, C: 0.02% or less by mass (excluding 0% by mass), Si: 0.08% or less by mass (excluding 0% by mass), Mn: 1.0% or less by mass (excluding 0% by mass), P: 0.04% or less by mass (excluding 0% by mass), S: 0.03% or less by mass (excluding 0% by mass), Cu: 0.5% or less by mass (excluding 0% by mass), V: 0.35% or less by mass (excluding 0% by mass), Co: 2.5% or less by mass (excluding 0% by mass), and Al: 0.1% or less by mass (excluding 0% by mass).

The components of the welding wire according to the present embodiment other than Al comply with the wire standard AWS A5.14 ERNiCrMo-4 of Hastelloy C276.

Ni: 50% or More by Mass

Ni is the main element constituting the matrix of the weld metal. In the present embodiment, the Ni content of the welding wire is 50% or more by mass in order to ensure the toughness and ductility of the weld metal and to prevent a decrease in the corrosion resistance of the weld metal.

Cr: 14.5% to 16.5% by Mass

Cr is an element needed to improve corrosion resistance to oxidizing acids. In order to sufficiently produce the effect, the Cr content of the welding wire in the present embodiment is 14.5% or more by mass, preferably 15.0% or more by mass. However, the addition of a large amount of Cr may precipitate Cr carbide and impair the mechanical properties of the welding wire. Thus, the Cr content of the welding wire is 16.5% or less by mass, preferably 16.0% or less by mass.

Mo: 15.0% to 17.0% by Mass

In combination with Cr, Mo can achieve high corrosion resistance not only to oxidizing acids but also to non-oxidizing acids and salts. In order to sufficiently produce the effect, the Mo content of the welding wire in the present embodiment is 15.0% or more by mass, preferably 15.5% or more by mass. However, the addition of a large amount of Mo may significantly precipitate an intermetallic compound of Mo and Ni or the like and impair the mechanical properties of the welding wire. Thus, the Mo content of the welding wire is 17.0% or less by mass, preferably 16.5% or less by mass.

W: 3.0% to 4.5% by Mass

The addition of W is expected to stabilize the $\gamma$ phase due to solid-solution strengthening and improve tensile strength. In order to sufficiently produce the effect, the W content of the welding wire in the present embodiment is 3.0% or more by mass, preferably 3.5% or more by mass. However, an excessive addition of W results in segregation of concentrated W, low toughness, and poor wire processability. Thus, the W content of the welding wire in the present embodiment is 4.5% or less by mass, preferably 4.0% or less by mass.

Fe: 4.0% to 7.0% by Mass

Fe dissolved in Ni alloys is effective in improving tensile strength. In order to sufficiently produce the effect, the Fe content of the welding wire in the present embodiment is 4.0% or more by mass, preferably 5.0% or more by mass. However, Fe precipitates as a low-melting-point Laves phase at grain boundaries and is remelted by reheating in multi-pass welding, thereby causing reheat liquefaction cracking at the grain boundaries. Thus, the Fe content of the welding wire in the present embodiment is 7.0% or less by mass, preferably 6.0% or less by mass.

C: 0.02% or Less by Mass (Excluding 0% by Mass)

C in Ni alloys is a solid-solution strengthening element and is effective in improving tensile strength. However, an excessively high C content results in solidification cracking and reduced low-temperature toughness of the weld metal. Thus, the C content of the welding wire in the present embodiment is 0.02% or less by mass, preferably 0.01% or less by mass.

Si: 0.08% or Less by Mass (Excluding 0% by Mass)

The addition of Si as a deoxidizer improves the blow hole (BH) resistance of the weld metal. However, the addition of a large amount of Si results in low hot cracking resistance. Thus, the Si content of the welding wire in the present embodiment is 0.08% or less by mass, preferably 0.05% or less by mass.

Mn: 1.0% or Less by Mass (Excluding 0% by Mass)

Mn is an element that forms a γ phase and is effective in strengthening the matrix. However, an excessive addition of Mn results in poor slag detachability. Thus, the Mn content of the welding wire in the present embodiment is 1.0% or less by mass, preferably 0.7% or less by mass.

P: 0.04% or Less by Mass (Excluding 0% by Mass)

P segregates at grain boundaries during solidification of the weld metal and causes solidification cracking. Thus, the P content of the welding wire in the present embodiment is 0.04% or less by mass, preferably 0.02% or less by mass.

S: 0.03% or Less by Mass (Excluding 0% by Mass)

Like P, S segregates at grain boundaries during solidification of the weld metal and causes solidification cracking. Thus, the S content of the welding wire in the present embodiment is 0.03% or less by mass, preferably 0.01% or less by mass.

Cu: 0.5% or Less by Mass (Excluding 0% by Mass)

Although the addition of Cu can impart corrosion resistance, an excessive addition of Cu increases welding crack susceptibility and results in solidification cracking or reheat cracking. Thus, the Cu content of the welding wire in the present embodiment is 0.5% or less by mass, preferably 0.1% or less by mass.

V: 0.35% or Less by Mass (Excluding 0% by Mass)

V is expected to stabilize the γ phase and improve strength due to solid-solution strengthening. The V content may be 0.35% or less by mass, preferably 0.1% or less by mass.

Co: 2.5% or Less by Mass (Excluding 0% by Mass)

Co is expected to increase the percentage of the γ phase, increase strength, and improve abrasion resistance. The Co content may be 2.5% or less by mass, preferably 1.0% or less by mass.

Al: 0.1% or Less by Mass (Excluding 0% by Mass)

The C content, the Si content, and the Al content of the weld metal can be effectively limited to improve the low-temperature toughness of the weld metal. If the C content and the Si content of the welding wire are limited to the specified ranges, the Al content of the welding wire can be 0.10% or less by mass, preferably 0.05% or less by mass, in order to ensure low-temperature toughness of the weld metal.

Other Components

Other components of the welding wire according to the present embodiment include incidental impurities, such as Ti, Mg, Nb, and N.

Bonded Flux

Second, the reason for limiting the amount of each component of the bonded flux (hereinafter also referred to as the bonded flux according to the present embodiment or simply as the flux) for use in the submerged arc welding process according to the present embodiment will be described below.

The bonded flux according to the present embodiment contains, based on the total mass of the bonded flux, $Al_2O_3$: 35% to 55% by mass, $SiO_2$: 5% to 25% by mass, CaO: 2% to 10% by mass, $CaF_2$: 25% to 45% by mass, and $Na_2O$: 2% to 4% by mass.

$Al_2O_3$: 35% to 55% by Mass $Al_2O_3$ in the flux acts as a slag forming agent, is effective in increasing the solidification temperature and viscosity of molten slag, and improves slag detachability. When the $Al_2O_3$ content of the flux is less than 35% by mass, molten slag has insufficient bead retention in horizontal position welding, and the bead has a significantly rough surface. Thus, the $Al_2O_3$ content of the flux in the present embodiment is 35% or more by mass. However, when the $Al_2O_3$ content of the flux is more than 55% by mass, slag has excessively high viscosity and poor fluidity and forms slag inclusions. Furthermore, this causes rough bead waves and increases the number of pockmarks. Thus, the $Al_2O_3$ content of the flux in the present embodiment is 55% or less by mass.

The $Al_2O_3$ content of the flux preferably ranges from 40% to 50% by mass. An $Al_2O_3$ content in this range, particularly in horizontal position welding, results in further appropriate bead retention of molten slag, stable and smooth bead shapes, and better bead appearances.

$SiO_2$: 5% to 25% by Mass $SiO_2$ in the flux is effective in increasing the solidification temperature of molten slag, improving bead retention, and stabilizing the bead shape. A part of $SiO_2$ in flux is reduced into Si, and this Si is contained in weld metal and increases the Si content of the weld metal. When the $SiO_2$ content of the flux is less than 5% by mass, the bead shape becomes unstable due to insufficient bead retention of molten slag. Thus, the $SiO_2$ content of the flux in the present embodiment is 5% or more by mass. However, a $SiO_2$ content of more than 25% by mass results in excessively high viscosity of molten slag, poor slag detachability, and the formation of slag inclusions. Furthermore, this results in a high Si content of the weld metal and reduced low-temperature toughness. Thus, the $SiO_2$ content of the flux in the present embodiment is 25% or less by mass.

The $SiO_2$ content of the flux preferably ranges from 13% to 18% by mass. A $SiO_2$ content in this range results in improved slag detachability and, particularly in horizontal position welding, results in even better slag detachability, stable and smooth bead shapes, good bead appearances, and good low-temperature toughness.

$CaF_2$: 25% to 45% by Mass $CaF_2$ in the flux is effective in stabilizing arc, increasing slag viscosity, and improving the bead shape. The addition of $CaF_2$ to the flux can reduce the amount of oxygen in the weld metal and improve low-temperature toughness. However, when the $CaF_2$ content of the flux is less than 25% by mass, these effects are insufficient. Thus, the $CaF_2$ content of the flux in the present embodiment is 25% or more by mass. However, when the $CaF_2$ content of the flux is more than 45% by mass, this results in unstable arc, poor fluidity of slag, and the formation of slag inclusions. Thus, the $CaF_2$ content of the flux in the present embodiment is 45% or less by mass.

The $CaF_2$ content of the flux preferably ranges from 30% to 35% by mass. A $CaF_2$ content in this range results in stable and smooth bead shapes and good bead appearances.

CaO: 2% to 10% by Mass

CaO in the flux is effective in increasing the basicity of slag and improving the low-temperature toughness of the weld metal. However, when the CaO content of the flux is less than 2% by mass, these effects are insufficient. Thus, the CaO content of the flux in the present embodiment is 2% or more by mass. However, when the CaO content of the flux is more than 10% by mass, this results in very poor slag detachability. Thus, the CaO content of the flux in the present embodiment is 10% or less by mass.

The CaO content of the flux preferably ranges from 4% to 8% by mass. A CaO content in this range particularly results in good slag detachability.

$Na_2O$: 2.0% to 4.0% by Mass $Na_2O$ in the flux is effective in improving arc stability, improving the convergence of arc, and preventing the formation of slag inclusions in the weld metal. When the $Na_2O$ content of the flux is less than 2.0% by mass, these effects are insufficient particularly in horizontal position welding. Thus, the $Na_2O$ content of the flux in the present embodiment is 2.0% or more by mass. However, when the $Na_2O$ content of the flux is more than 4.0% by mass, slag detachability deteriorates. Thus, the $Na_2O$ content of the flux in the present embodiment is 4.0% or less by mass.

The $Na_2O$ content of the flux preferably ranges from 2.5% to 3.5% by mass. A $Na_2O$ content in this range particularly results in good slag detachability.

The C content, the Si content, and the Al content of the weld metal can be effectively limited to improve the low-temperature toughness of the weld metal. Thus, the C source, the Si source, and the Al source in the flux that may remain in the weld metal are preferably not added. Thus, the flux preferably contains as small amounts of carbonates and metallic deoxidizing components as possible.

Carbonates

The addition of a carbonate, such as $BaCO_3$ or $CaCO_3$, from the flux produces $CO_2$ in the welding process and increases the number of pockmarks on the bead surface. Furthermore, a carbide is formed in the weld metal and impairs low-temperature toughness. Thus, the flux in the present embodiment is preferably substantially free of carbonates. The phrase “substantially free of carbonates”, as used herein, means that carbonates are not intentionally added. For example, although the raw materials used for production may contain carbonates as impurities, carbonates in an amount that does not affect the present invention, for example, 0.1% or less by mass, are allowable.

Metallic Deoxidizing Components

Metallic deoxidizing components Al and Si added from the flux are reduced and form an intermetallic compound in the weld metal. The intermetallic compound impairs low-temperature toughness. Thus, the flux in the present embodiment is preferably substantially free of metallic deoxidizing components Al and Si. The phrase “substantially free of Al and Si”, as used herein, means that Al and Si are not intentionally added. For example, although the raw materials used for production may contain Al and Si as impurities, Al and Si in an amount that does not affect the present invention, for example, 0.1% or less by mass, are allowable. The term “Al”, as used herein, includes Al alone and Al added in the form of Fe-Al or the like. The term “Si”, as used herein, includes Si alone and Si added in the form of Fe-Si or the like.

Other Components

Other components of the flux according to the present embodiment include incidental impurities of raw materials for the flux, such as P, S, Fe, and water.

The bonded flux according to the present embodiment may be produced by preparing the raw materials of the specified composition, adding a water glass binder and a lubricant to the raw materials, granulating the raw materials, and sintering the granules. The sintering temperature may be, but is not limited to, in the range of 470° C. to 600° C.

In the submerged arc welding process according to the present embodiment, the welding wire and the bonded flux are used in combination, and the other welding conditions may be appropriately chosen from the welding conditions for submerged arc welding.

A base material to be welded by the submerged arc welding process according to the present embodiment may be a 9% Ni steel or another steel for cryogenic liquid storage, such as 1.5% to 2.5% Ni steel, 3.5% Ni steel, 5% Ni steel, or austenitic stainless steel.

EXAMPLES

The advantages of the present invention are more specifically described in the following examples.

Submerged arc welding wires containing the chemical components listed in Table 1 were used. The wires had a diameter of 2.4 mm.

TABLE 1

| No. | Chemical components of wire (% by mass) | | | | | | |
|---|---|---|---|---|---|---|---|
| | C | Si | Mn | P | S | Cu | Ni |
| GW1 | 0.005 | 0.048 | 0.51 | <0.002 | 0.002 | 0.01 | 58.00 |
| NW1 | 0.002 | 0.030 | 0.48 | 0.005 | 0.001 | 0.01 | 56.90 |
| | Cr | Mo | V | Fe | W | Co | Al |
| GW1 | 15.54 | 16.07 | <0.01 | 5.78 | 3.71 | <0.01 | 0.04 |
| NW1 | 15.93 | 16.43 | <0.01 | 6.11 | 3.45 | <0.01 | 0.27 |

A submerged arc welding flux having the chemical composition listed in Table 2 was produced by preparing the flux raw materials, adding a water glass binder to the flux raw materials, granulating the flux raw materials, and sintering the granules at 500° C.

TABLE 2

| | Flux components (% by mass) | | | | | | |
|---|---|---|---|---|---|---|---|
| No. | $Al_2O_3$ | $SiO_2$ | $CaF_2$ | CaO | $Na_2O$ | Carbonate | Al and Si (metallic deoxidizing components) |
| GF1 | 43 | 16 | 32 | 6 | 3.0 | 0 | 0 |
| GF2 | 51 | 14 | 26 | 6 | 3.0 | 0 | 0 |
| GF3 | 43 | 19 | 32 | 3 | 3.0 | 0 | 0 |
| GF4 | 40 | 16 | 36 | 6 | 2.0 | 0 | 0 |
| GF5 | 39 | 17 | 32 | 9 | 3.0 | 0 | 0 |
| GF6 | 46 | 12 | 32 | 6 | 4.0 | 0 | 0 |
| NF1 | 42 | 16 | 32 | 6 | 3.0 | 1 | 0 |
| NF2 | 42 | 16 | 32 | 6 | 3.0 | 0 | 1 |
| NF3 | 56 | 16 | 19 | 6 | 3.0 | 0 | 0 |
| NF4 | 40 | 26 | 30 | 1 | 3.0 | 0 | 0 |
| NF5 | 34 | 13 | 46 | 4 | 3.0 | 0 | 0 |
| NF6 | 40 | 16 | 32 | 11 | 1.0 | 0 | 0 |
| NF7 | 48 | 4 | 35 | 8 | 5.0 | 0 | 0 |

A 9% Ni steel containing the chemical components listed in Table 3 was used as a base material.

TABLE 3

| | Chemical components of base material (% by mass) | | | | | | | |
|---|---|---|---|---|---|---|---|---|
| Type of steel | C | Si | Mn | P | S | Ni | Al | Fe |
| 9% Ni steel (SL9N590) | 0.05 | 0.24 | 0.58 | 0.002 | 0.001 | 9.01 | 0.0030 | remainder |

Figure 1B:
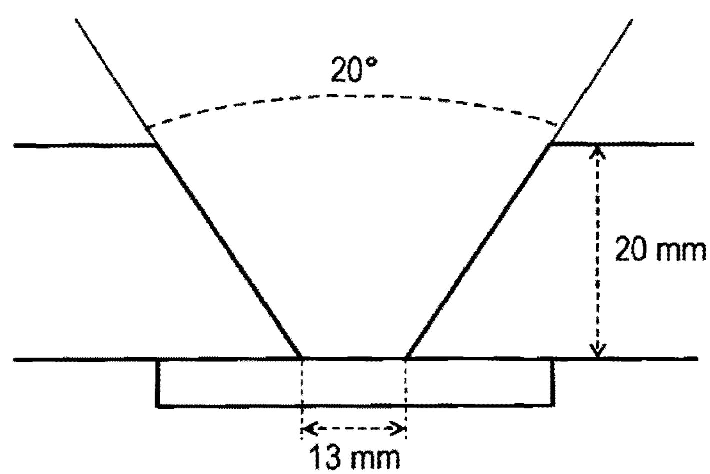
FIG. 1B is a cross-sectional view showing the groove shape of the base material from which Charpy impact test specimens are taken.
Figure 1C:
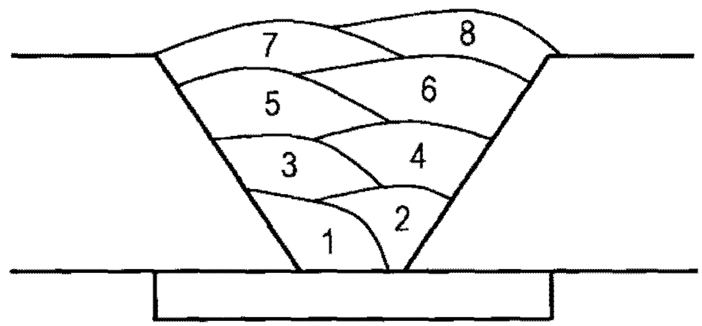
FIG. 1C is a schematic view illustrating how to form deposited metal layers in a Charpy impact test specimen.
Figure 1D:
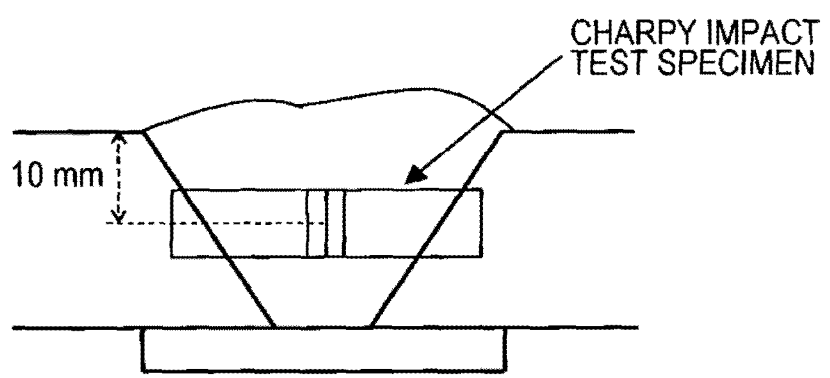
FIG. 1D is a cross-sectional view showing the position at which a Charpy impact test specimen is taken.

Low-temperature toughness was measured in all deposited metal. Table 4 shows the test conditions. FIGS. 1A and 1B show the shape and size of the welding base material. FIG. 1A is a front view showing the shape and size of the base material, and FIG. 1B is a cross-sectional view showing the groove shape. FIG. 1C is a schematic view illustrating how to form deposited metal layers. The number is Path Sequence. A Charpy impact test specimen with a V notch 2 mm in depth was taken at a test specimen sampling position illustrated in FIG. 1D and was measured in terms of low-temperature toughness at −196° C.

Table 9 shows the measurements of low-temperature toughness. Low-temperature toughness was rated as good, fair, and poor when the impact value at −196° C. was 70 J or more, less than 70 J and 55 J or more, and less than 55 J, respectively. Good and fair are acceptable.

TABLE 4

| | |
|---|---|
| Welding position | Flat position |
| Polarity | Direct current electrode positive (DCEP) |
| Wire diameter | 2.4 mm |
| Welding current (A) | 330 |
| Welding voltage (V) | 27 |
| Welding speed (cm/min) | 30 |
| Wire extension (mm) | 25 |
| Weld length (mm) | 350 |

Figure 2A:
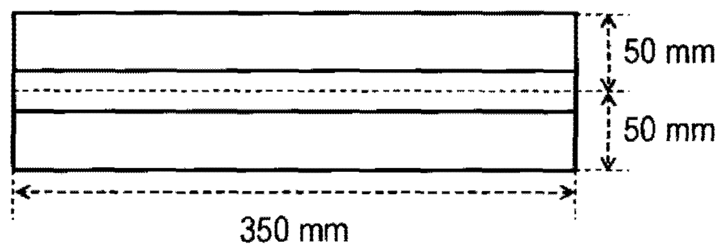
FIG. 2A is a front view showing the shape and size of a base material in a horizontal groove filling test.
Figure 2B:
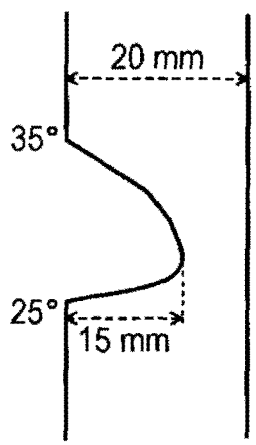
FIG. 2B is a cross-sectional view showing the groove shape.
Figure 2C:
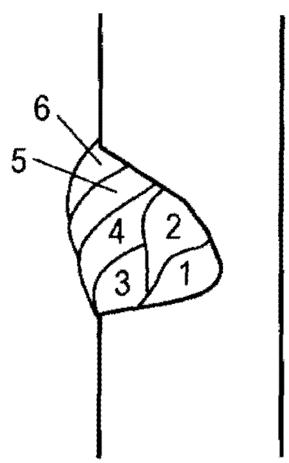
FIG. 2C is a schematic view illustrating how to form deposited metal layers in the horizontal groove filling test.

Pockmarks and welding performance (sagging of beads, smoothness of the bead shape, and slag inclusions) were evaluated in a horizontal groove filling test. Table 5 shows the welding conditions. FIGS. 2A and 2B show the shape and size of the welding base material. FIG. 2A is a front view showing the shape and size of the base material, and FIG. 2B is a cross-sectional view showing the groove shape. FIG. 2C is a schematic view illustrating how to form deposited metal layers. The number is Path Sequence.

TABLE 5

| | |
|---|---|
| Welding position | Horizontal |
| Polarity | Direct current electrode positive (DCEP) |
| Wire diameter | 2.4 mm |
| Welding current (A) | 300-340 |
| Welding voltage (V) | 27-28 |
| Welding speed (cm/min) | 30-45 |
| Wire extension (mm) | 25 |
| Weld length (mm) | 350 |

Figure 3:
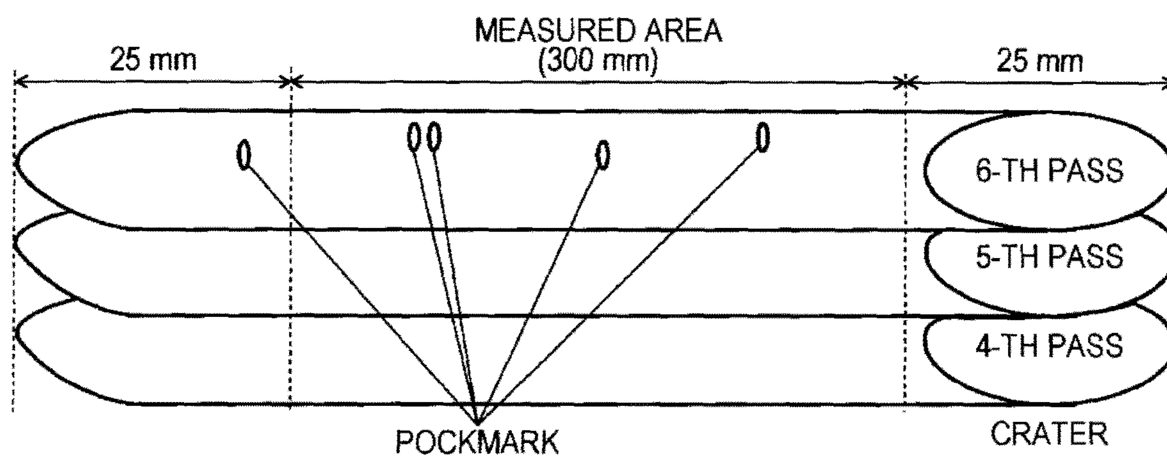
FIG. 3 is a schematic view illustrating an outline of pockmark analysis of a deposited metal surface in a horizontal groove filling test.

As illustrated in FIG. 3, the number of pockmarks 1 mm or more in length in a 300-mm central portion except 25-mm ends was counted on the deposited metal surface in the horizontal groove filling test illustrated in FIG. 2C. Table 6 shows the evaluation criteria. Table 9 shows the evaluation results. Good and fair are acceptable.

TABLE 6

| Ratings | Number of pockmarks (/300 mm) |
|---|---|
| Good | 10 or less |
| Fair | 11 or more and 15 or less |
| Poor | 16 or more |

Figure 4:
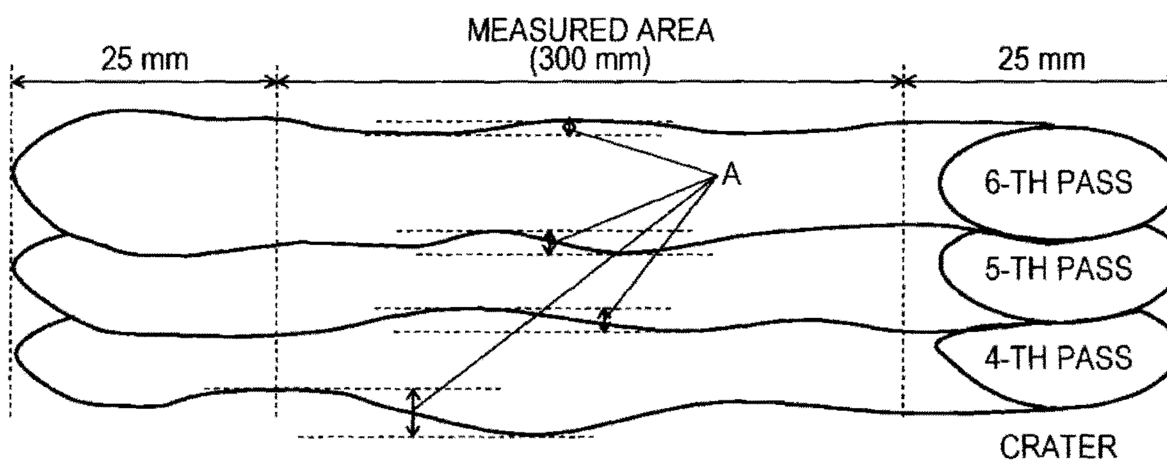
FIG. 4 is a schematic view illustrating an outline of the evaluation of sagging of a bead on a deposited metal surface in a horizontal groove filling test.

As illustrated in FIG. 4, sagging of beads on the deposited metal surface in the horizontal groove filling test illustrated in FIG. 2C was rated with respect to the displacement (A) of the lower and upper sides of each bead in the height direction. The maximum of the displacement (A) in a 300-mm central portion except 25-mm ends was rated according to the criteria listed in Table 7. Table 9 shows the evaluation results. Good and fair are acceptable.

TABLE 7

| Ratings | Maximum displacement (A) |
|---|---|
| Good | 3 mm or less |
| Fair | more than 3 mm, 6 mm or less |
| Poor | more than 6 mm |

Figure 5A:
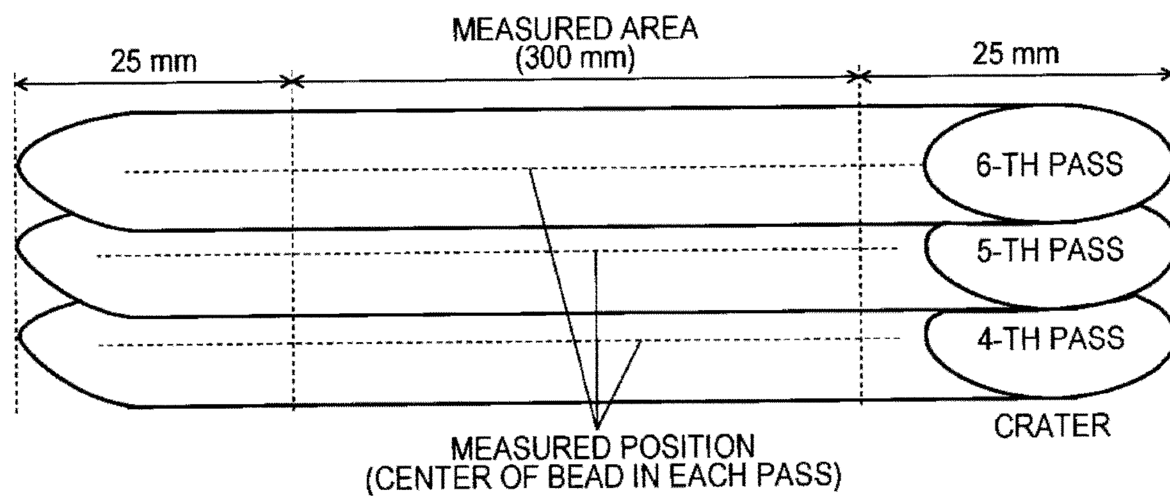
FIG. 5A is a schematic view illustrating an outline of the evaluation of bead smoothness on a deposited metal in a horizontal groove filling test.
Figure 5B:
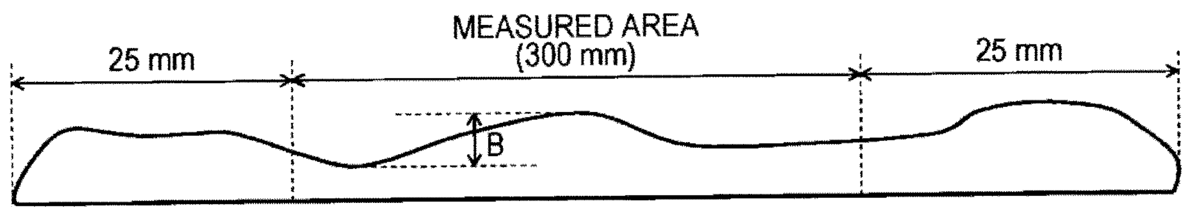
FIG. 5B is a cross-sectional view showing a measurement position in FIG. 5A.

As illustrated in FIGS. 5A and 5B, bead smoothness on the deposited metal surface in the horizontal groove filling test illustrated in FIG. 2C was rated with respect to the maximum roughness (B) of the bead surface in a 300-mm central portion except 25-mm ends. Table 8 shows the evaluation criteria. Table 9 shows the evaluation results. Good and fair are acceptable.

TABLE 8

| Ratings | Maximum roughness (B) |
|---|---|
| Good | 2 mm or less |
| Fair | more than 2 mm, 4 mm or less |
| Poor | more than 4 mm |

Slag detachability from deposited metal in the horizontal groove filling test illustrated in FIG. 2C was evaluated along the total length of each bead. Complete removal of slag after 10 hits or less with a slag hammer was rated as good. Partial removal of slag near the bead after 10 hits or less but complete removal of slag after 11 to 19 hits was rated as fair. Incomplete removal of slag after 20 hits or more was rated as poor. Table 9 shows the evaluation results. Good and fair are acceptable.

TABLE 9

| | Flux x wire | | Low-temperature toughness | | Welding performance | | |
|---|---|---|---|---|---|---|---|
| Examples | Flux No. | Wire No. | vE −196° C. [J] | Pockmarks [/300 L] | Sagging of bead | Smooth bead shapes | Slag detachability |
| 1 | GF1 | GW1 | 96 good | 7 good | good | good | good |
| 2 | GF2 | | 81 good | 12 fair | fair | fair | fair |
| 3 | GF3 | | 75 fair | 9 good | good | good | fair |
| 4 | GF4 | | 98 good | 8 good | good | good | fair |
| 5 | GF5 | | 92 good | 9 good | fair | fair | fair |
| 6 | GF6 | | 95 good | 10 good | fair | fair | fair |
| 7 | NF1 | GW1 | 71 fair | 12 fair | good | good | good |
| 8 | NF2 | | 56 fair | 9 good | good | good | good |
| 9 | NF3 | | 48 poor | 24 poor | good | poor | poor |
| 10 | NF4 | | 38 poor | 10 good | good | good | poor |
| 11 | NF5 | | 91 good | 7 good | poor | poor | poor |
| 12 | NF6 | | 89 good | 9 good | good | good | poor |
| 13 | NF7 | | 88 good | 7 good | poor | poor | poor |
| 14 | GF1 | NW1 | 47 poor | 10 good | good | good | good |
| 15 | GF2 | | 41 poor | 18 poor | fair | poor | fair |
| 16 | GF3 | | 32 poor | 8 good | good | good | fair |
| 17 | GF4 | | 47 poor | 10 good | good | good | fair |
| 18 | GF5 | | 48 poor | 9 good | fair | fair | fair |
| 19 | GF6 | | 50 poor | 8 good | fair | fair | fair |
| 20 | NF1 | | 41 poor | 18 poor | good | good | good |
| 21 | NF2 | | 24 poor | 8 good | good | good | good |
| 22 | NF3 | | 21 poor | 20 poor | good | poor | poor |
| 23 | NF4 | | 14 poor | 8 good | good | good | poor |
| 24 | NF5 | | 51 poor | 7 good | poor | poor | poor |
| 25 | NF6 | | 52 poor | 7 good | good | good | poor |
| 26 | NF7 | | 48 poor | 9 good | poor | poor | poor |

Examples 1 to 26 include working examples 1 to 8 and comparative examples 9 to 26. Table 9 shows that Examples 1 to 8 had high low-temperature toughness, a small number of pockmarks, and good welding performance because the Al content of each wire was low and because the chemical components of the flux were appropriately adjusted.

Example 9 had an increased number of pockmarks, an unstable bead shape, and poor slag detachability because the $Al_2O_3$ content of the flux was above the upper limit of the scope of the present invention. Furthermore, because the $CaF_2$ content was below the lower limit of the scope of the present invention, the bead shape became more unstable, and the low-temperature toughness was reduced.

Example 10 had poor slag detachability because the $SiO_2$ content of the flux was above the upper limit of the scope of the present invention. Example 10 also had reduced low-temperature toughness due to the effects of $SiO_2$ and because the CaO content was below the lower limit of the scope of the present invention.

Example 11 had poor slag detachability because the $CaF_2$ content of the flux was above the upper limit of the scope of the present invention. Example 11 also had sagging of the bead and a rough bead surface because the $Al_2O_3$ content was below the lower limit of the scope of the present invention.

Example 12 had poor slag detachability because the CaO content of the flux was above the upper limit of the scope of the present invention and because the $Na_2O$ content was below the lower limit of the scope of the present invention.

Example 13 had poor slag detachability because the $Na_2O$ content of the flux was above the upper limit of the scope of the present invention. Example 13 also had sagging of the bead and a rough bead surface because the $SiO_2$ content was below the lower limit of the scope of the present invention.

Examples 14 to 26 had reduced low-temperature toughness irrespective of the composition of the flux because the Al content of each wire was more than 0.10% by mass.

Example 14 had a small number of pockmarks and good welding performance because the chemical components of the flux were appropriately adjusted, but had reduced low-temperature toughness due to the effects of the wire.

Example 15 had a slightly increased number of pockmarks and slightly poor slag detachability because the $Al_2O_3$ content of the flux was above the upper limit of the preferred range specified in the present invention. Example 15 also had a poor bead shape due to the effects of $Al_2O_3$ and because the $CaF_2$ content was below the lower limit of the preferred range specified in the present invention.

Example 16 had slightly poor slag detachability because the $SiO_2$ content of the flux was above the upper limit of the preferred range specified in the present invention. Example 16 also had reduced low-temperature toughness due to the effects of $SiO_2$ and because the CaO content was below the lower limit of the preferred range specified in the present invention.

Example 17 had slightly poor slag detachability because the $CaF_2$ content of the flux was above the upper limit of the preferred range specified in the present invention. Example 17 also had slightly poor slag detachability because the $Na_2O$ content was below the lower limit of the preferred range specified in the present invention.

Example 18 had slightly poor slag detachability because the CaO content of the flux was above the upper limit of the preferred range specified in the present invention. Example 18 also had slight sagging of the bead and a slightly rough bead surface because the $Al_2O_3$ content was below the lower limit of the preferred range specified in the present invention.

Example 19 had slightly poor slag detachability because the $Na_2O$ content of the flux was above the upper limit of the preferred range specified in the present invention. Example 19 also had slight sagging of the bead and a slightly rough bead surface because the $SiO_2$ content was below the lower limit of the preferred range specified in the present invention.

The effects of the composition of the flux on low-temperature toughness, the number of pockmarks, and welding performance in Examples 20 to 26 were similar to those in Examples 7 to 13. Examples 20 to 26 had reduced low-temperature toughness, an increased number of pockmarks, and poor welding performance.

As described in detail, the present invention appropriately adjusts the chemical components of the wire and the chemical components of the flux and thereby produces a weld metal with good low-temperature toughness in welding of Hastelloy C276 submerged arc welding materials (welding wire and fluxes) and achieves good welding performance (bead shapes and bead appearances).

What is claimed is:

1. A submerged arc welding process using a welding wire and a bonded flux in combination, wherein the welding wire contains, based on a total mass of the welding wire, Ni: 50% or more by mass, Cr: 14.5% to 16.5% by mass, Mo: 15.0% to 17.0% by mass, W: 3.0% to 4.5% by mass, Fe: 4.0% to 7.0% by mass, C: 0.02% or less by mass (excluding 0% by mass), Si: 0.08% or less by mass (excluding 0% by mass), Mn: 1.0% or less by mass (excluding 0% by mass), P: 0.04% or less by mass (excluding 0% by mass), S: 0.03% or less by mass (excluding 0% by mass), Cu: 0.5% or less by mass (excluding 0% by mass), V: 0.35% or less by mass (excluding 0% by mass), Co: 2.5% or less by mass (excluding 0% by mass), and Al: 0.1% or less by mass (excluding 0% by mass), and the bonded flux contains, based on a total mass of the bonded flux, $Al_2O_3$: 35% to 55% by mass, $SiO_2$: 5% to 25% by mass, CaO: 2% to 10% by mass, $CaF_2$: 25% to 45% by mass, and $Na_2O$: 2% to 4% by mass, wherein the bonded flux is substantially free of Al and Si.

2. The submerged arc welding process according to claim 1, wherein the bonded flux is substantially free of carbonates.

3. The submerged arc welding process according to claim 2, applied to welding of steel for cryogenic liquid storage.

4. The submerged arc welding process according to claim 1, applied to welding of steel for cryogenic liquid storage.

* * * * *